Figure 1:
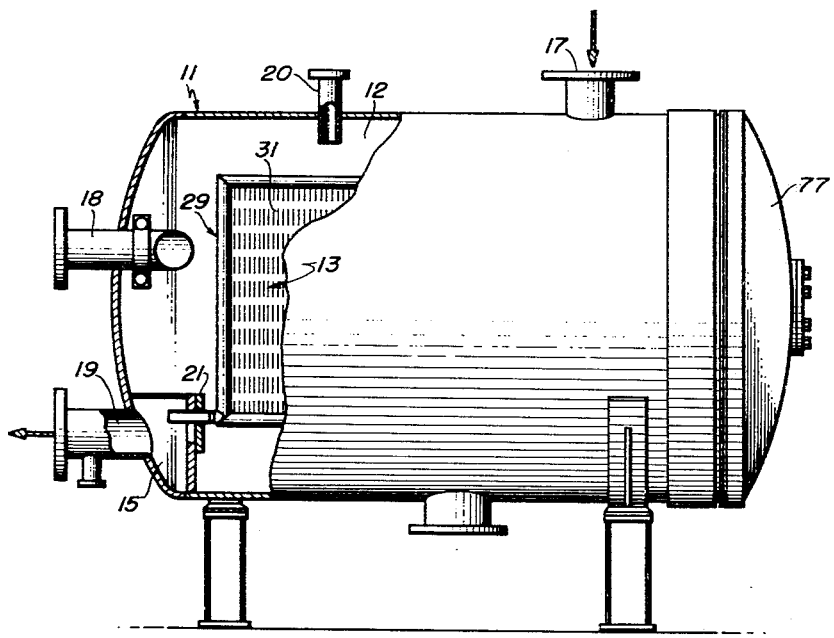

INVENTOR.
EDWARD A. ULRICH
BY
Albert L. Jeffers
ATTORNEY

INVENTOR.
EDWARD A. ULRICH

United States Patent Office 3,003,642
Patented Oct. 10, 1961

3,003,642
FILTER ASSEMBLY AND AUTOMATIC
SHUT-OFF VALVE THEREFOR
Edward A. Ulrich, Kenmore, N.Y., assignor to Process
Filters, Inc., Buffalo, N.Y., a corporation of New York
Filed June 5, 1957, Ser. No. 663,738
5 Claims. (Cl. 210—347)

The invention relates generally to filter means and more particularly is directed to a filter assembly for removing foreign matter from a liquid.

The filter assembly embodying the subject invention may be utilized in any system where applicable but as disclosed herein one, or more commonly a plurality are adapted for disposition in a tank containing a liquid to be filtered and all are connected to a manifold or pipe therein for receiving and conducting the filtrate exteriorly of the tank. Each filter assembly is of the type which includes a filter element preferably in the form of a hollow bag or enclosure and provision is made for circulating a solution containing solids such as diatomaceous earth material or equivalent material through the tank for the purpose of applying or depositing a coating or layer of such material on the exterior surfaces of the filter element, after which the liquid to be conditioned is then forced into the tank so that the foreign matter therein will be held by the filter element and material, and thereby allow the filtrate to pass into the manifold and be discharged for the use intended.

The filter element constituting a component of the filter assembly of the subject invention is preferably constructed of some desirable porous fabric or fibrous material, such as cloth or paper. Such filters are relatively fragile or unstable in character so that when subjected to various pressure values or through prolonged use or rough handling when installed, they are torn or eventually break down or disintegrate and allow the unfiltered liquid including foreign matter to flow into the manifold and thereby mix with and contaminate the filtrate therein.

With the foregoing in mind, one of the important objects of the subject invention is to provide a filter assembly comprising, among other things, a filter device and a valve device or trap, connectible with a manifold or the equivalent, and which operates automatically to prevent flow of a liquid containing foreign matter therethrough to the manifold whenever the filter element of the assembly is rendered useless. More specifically in this respect, whenever a filter element breaks or deteriorates portions thereof and/or some of the earth material, foreign matter or solids desired to be contained therein will find their way into the valve device to clog or fill it and thereby stop the flow so that the unfiltered liquid cannot enter the manifold.

A particular object of the invention is to provide a filter assembly in which the filter device thereof includes a support preferably in the form of a single expanded metal member secured within a generally rectangular frame to constitute a supporting unit or leaf and provide the frame with a tubular fitting for detachable connection with a mounting for attachment to the manifold.

An important object of the invention is to provide an elongated filter element which is preferably in the form of a hollow bag or enclosure having an opening therein through which the supporting unit may be inserted and provide unique means for detachably connecting the element to the unit. More specifically in this regard, an object is to provide the frame of the supporting unit with means for receiving the marginal portions of the element defining the opening therein and provide yieldable means, preferably in the form of an elastomeric band surrounding the element for holding the marginal portions thereof in the receiving means and in a clamped sealed relationship against the frame.

A significant object of the invention is to provide a filter assembly in which the valve device is detachably connected to the filter device through a tubular mounting, which is common to both devices, in a manner whereby the devices can be readily assembled and disassembled to facilitate repair or replacement of the components thereof.

A specific object of the invention is to provide the tubular fitting of the filter device with means preferably in the form of a threaded sleeve to facilitate connecting the filter assembly to the mounting and provide the fitting with apertures or ports for establishing communication between the interiors of the fitting and filter frame and bag element.

An important object of the invention is to provide a valve device which preferably includes an elongated tubular support which is carried by the mounting and extends into the tubular fitting and is provided with openings to establish communication between the interiors of the fitting and support. A filtering media preferably in the form of a tube is mounted on the support and the arrangement is such that the filtrate will flow into the fitting through the apertures therein, through the filter media or tube, into the support through the openings therein, and then out through the tubular mounting into the manifold chamber. The tube may be constructed from any suitable material, such as fabric, felt, paper or screen and is preferably formed so that it may be wrapped spirally about the tubular support and over the openings therein.

A particular object of the invention is to provide unique means for supporting the filter assemblies and facilitating their connection with the manifold by piloting and aligning the tubular mountings of the assemblies with openings provided in the manifold.

Additional objects of the invention reside in providing a filter assembly comprised of a minimum number of components which offer advantages with respect to manufacture, assembly and installation, efficiency and durability.

Other objects and advantages of the invention will readily become apparent after the description hereinafter set forth is considered in conjunction with the drawings annexed hereto wherein a preferred embodiment of the structure is exemplified.

Figure 2:
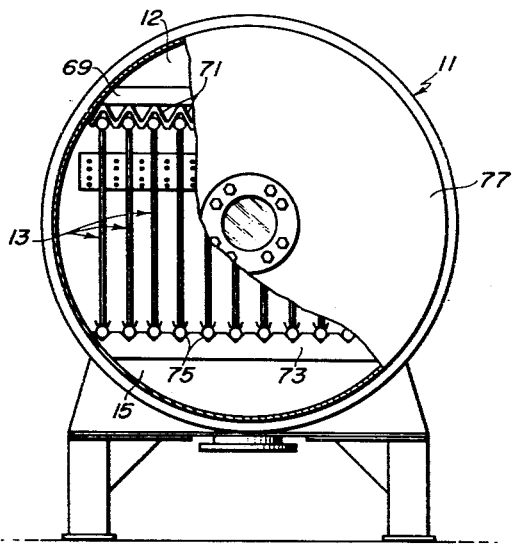
Figure 3:
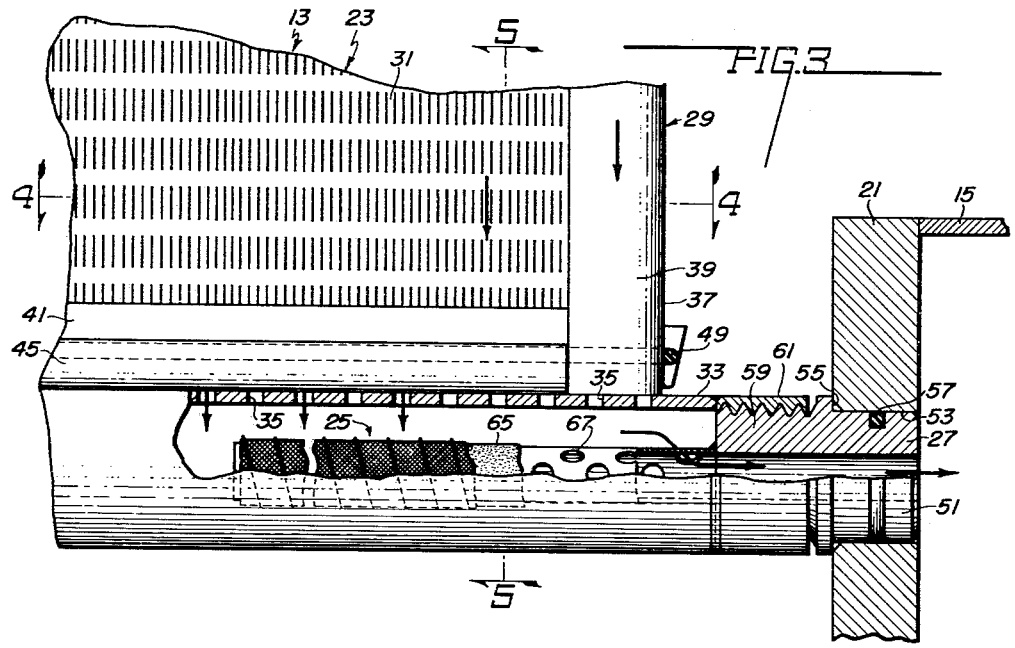
Figure 4:
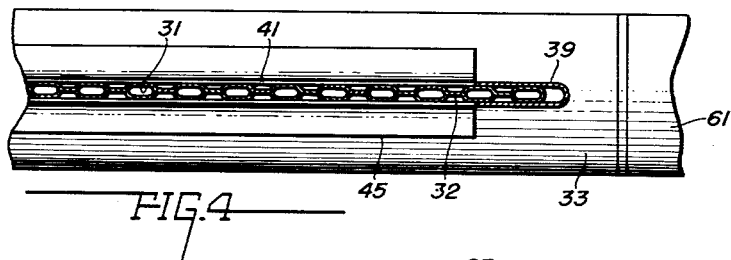

In the drawings:
FIGURE 1 is a front elevational view of a tank with portions in section to illustrate filter assemblies embodying the invention supported in the tank;
FIGURE 2 is an elevational end view of the tank with portions in section to depict certain structure;
FIGURE 3 is an enlarged partial vertical section taken through one of the filter assemblies in the tank;
FIGURE 4 is a partial horizontal section taken substantially on line 4—4 of FIGURE 3 to show structural characteristics of the filter device; and
FIGURE 5 is a vertical section taken substantially on line 5—5 of FIGURE 3.

Referring first to FIGURES 1 and 2 of the drawings, numeral 11 designates a tank forming a chamber 12 within which a plurality of filter assemblies generally designated 13 are mounted for connection with a manifold 15 in the tank. The tank is provided with an inlet 17 communicating with the tank chamber and an outlet 19, communicating with the manifold, through which the filtrate may be dispensed or discharged. The manifold preferably includes an L-shaped structure secured in the tank to form in combination therewith a chamber communicating with the outlet 19. The manifold is provided with a plate 21 having openings which receive mountings of the filter assemblies, all of which will be referred to more in detail after the filter assembly is described. The numeral 18 designates a slurry inlet and 20 a vent.

Figure 5:
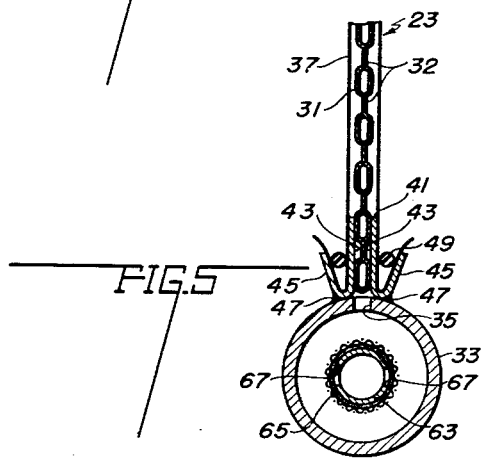

Referring to FIGURES 3, 4 and 5, the filter assembly includes a filter device generally designated 23 and a valve device generally designated 25, which are attached to a mounting 27 common thereto.

The filter device may be designed and constructed in various ways but as exemplified herein, includes a generally rectangular frame 29, a support or grid 31, a tubular fitting or support 33 for the frame provided with lateral apertures or ports 35 and a filter element 37 preferably in the form of a paper bag or cloth enclosure. The frame is comprised of a pair of channel side members 39 and a pair of upper and lower channel members 41—one of each is shown in FIGURE 3. The grid or support 31, among other things, serves to space apart opposed portions of the filter element and is preferably constructed of some desirable metal, which is expanded and corrugated to form openings or passages 32 therein. The marginal edges of the grid are preferably spot welded or otherwise secured between flanges 43 on the channel members as depicted in FIGURE 5. The lower channel member 41 of the filter supporting unit is preferably provided with upwardly extending inclined flanges 45 which are sealed to the fitting by continuous welds 47 and provides channel means for receiving the lower marginal edge portions of the filter element, bag or cover. More specifically in this regard, the marginal edge portions of the bag are crowded into the receiving means which affords a plurality of bearing surfaces and fastening means preferably in the form of an elastomeric band 49 surrounds the bag and clamps the edge portions thereof against the bearing surfaces to detachably seal the edge portions against the supporting frame or unit. The band is pressed or wedged into the receiving means and exerts a pressure to further assist in holding the band in place and against the filter bag at spaced locations to afford a dual seal. The channel members of the supporting unit provide a continuous chamber about the grid in order that the filtered liquid may flow therethrough and through the grid prior to entering the chamber of the tubular fitting through the ports 35 therein.

The mounting 27 is provided with a cylindrical portion 51 for disposition in an opening 53 provided in the manifold plate 21 and a shoulder 55 which bears against the plate. The portion 51 is provided with an exterior annular groove within which a gasket 57 is disposed for sealing the mounting in the opening. The mounting is also provided with an exteriorly threaded portion 59 which is detachably received in a threaded part 61 of the fitting.

The valve device generally designated 25 may be designed and constructed in various ways but as exemplified herein includes a tubular support 63 and a valve element 65. The support has one end which is secured to the mounting to position the support in a concentric spaced relation within the fitting 33 so that the filtrate may circulate about the support and valve element prior to flowing into the support through openings or ports 67 provided therein. The valve may be constructed of any desirable porous filtering media, such as cloth, paper, screen, felt and the like and is preferably constructed in strip or ribbon form so that it can be wrapped spirally and snugly about the support over the openings 67 therein so the filtrate must flow through the filter valve before passing into said openings. As illustrated in FIGURE 3 the valve assembly is preferably constructed of a tubular support 63 having ports or apertures 67, and is covered by wrapping a strip of porous filter material such as felt, Teflon felt, or paper and secured thereon by a wire mesh screen. The valve element is so constructed that whenever the filter bag or element 37 blows or deteriorates, foreign matter such as fragments of the filter bag and/or diatomaceous earth filter material on the bag, and/or foreign matter in the unfiltered liquid will find their way into the valve and quickly fill the pores therein, and thereby automatically close the valve and prevent flow of such foreign matter and/or unfiltered liquid into the manifold to contaminate the filtrate therein.

In view of the foregoing it will be manifest that in each of the filter assemblies the liquid passes through the earth material and filter bag, grid 31 and into the continuous chamber formed by the channel frame members, into the fitting 33 through the apertures 35 therein, valve element, openings in the support and through the mounting out into the manifold 15 from which the filtrate may be withdrawn from the outlet 19. The tank may be provided with a suitable pressure gauge, not shown, which may be utilized to assist in determining when one or more filter elements are required. The factors of time and/or volume of liquid discharged from the tank may also be considered in determining when new filter elements are needed.

Attention is directed to the fact that the filter elements and diatomaceous earth material or equivalent material thereon, and the valve normally serve as filters.

As alluded to above, one of the objects of the invention is to provide a unique way of supporting the filter assemblies in the tank as well as assist in piloting them into connection with the manifold. More particularly in this respect, the tank, as shown in FIGURE 2, is provided with an upper horizontal bar 69 which carries a plurality or row of generally V-shaped channels 71 and a lower horizontal bar 73 which carries a plurality or row of corresponding or similar channels 75. The upper and lower rows of channels are disposed in opposed parallel relationship and slidably receive and support the upper and lower extremities of the filter devices of the assemblies. With this organization, the filter assemblies may be selectively slid into a pair of channels to place them in a predetermined spaced parallel relationship and at the same time afford a setup whereby the mountings 27 of the assemblies are aligned with the openings 53 in the manifold plate 21 so as to pilot or facilitate entry of the mountings into the openings. A removable closure 77 affords access to the interior of the tank.

In view of the foregoing, it will be manifest that although the filter assemblies are disposed in vertical positions, it is to be understood that insofar as the subject invention is concerned they may be mounted in other positions, such as in a horizontal or inclined position.

Moreover, it is to be understood that the valve device described may be modified and that the valve element may be constructed from different materials and formed in other shapes to accomplish the desired results.

Having thus described my invention, it is obvious that various modifications may be made in the same without departing from the spirit of the invention, and, therefore, I do not wish to be understood as limiting myself to the exact form, construction, arrangement, and combination of parts herein shown and described.

I claim:

1. An assembly of the kind described for filtering a fluid, said assembly having a mounting, a fitting connected to the mounting and provided with an opening, a frame secured to the fitting, a filter element enclosing the frame, said filter element adapted to support a filter agent, the improvement comprising a tubular support extending from the mounting and provided with a lateral aperture, and valve means carried by the support and disposed across the aperture, said valve means being of such a character that a fluid may readily flow therethrough until the filter element is rendered useless, in which event any solid matter in the unfiltered fluid will clog the valve means and prevent flow of the fluid through the aperture in the support.

2. An assembly of the kind described for filtering a fluid containing foreign matter, said assembly having a mounting, a tubular fitting connected to the mounting and provided with a passage, a frame secured to the fitting, a filter bag enclosing the frame and communicating with the passage, said filter bag adapted to support a filtering agent, the improvement comprising a tubular support extending from the mounting into the fitting and provided with an aperture communicating with the passage in the fitting, a porous valve disposed across the aperture, said valve being of such a character that fluid filtered through the bag will flow freely through the valve and when the bag is rendered useless unfiltered fluid will circulate into the support so that foreign matter in the unfiltered fluid carried along with such fluid will clog the valve and prevent flow of such matter through the aperture in the support.

3. The assembly defined in claim 2, in which the valve is hollow and sealed about the support.

4. An assembly of the kind described for filtering a fluid containing foreign matter, said assembly having a fitting having a chamber provided with a passage communicating therewith, a filter element adapted to support a filter agent disposed across the passage for filtering the fluid prior to entry into the chamber, the improvement comprising a chambered support arranged in the chamber and provided with an aperture communicating with the passage and also having an outlet, and porous media disposed across the aperture affording normal flow of the filtered fluid therethrough into the support and also serving as a valve to stop such flow when clogged by foreign matter whenever the filter element permits release of the unfiltered fluid into the support through said passage.

5. In combination: a tank having a chamber and a manifold provided with an opening affording communication between the chamber and manifold, a tubular mounting disposed in the chamber and secured in the opening, a tubular fitting extending from the mounting and provided with a passage, a frame having a perforated grid, a filter element enclosing the frame with its interior communicating with the passage, said filter element adapted to support a filtering agent, the improvement comprising an elongated tubular support connected to the mounting and extending into the fitting, said support being provided with an aperture, filter media enclosing the support and covering the aperture, the arrangement being such that an unfiltered fluid containing foreign matter in the tank will flow through the element to filter out the foreign matter and allow the filtrate to normally flow into the tubular support through the media and aperture and when the condition of the element permits the unfiltered fluid to flow into the fitting through the passage foreign matter in the fluid will clog the media and thereby automatically prevent flow of the unfiltered fluid into the support.

References Cited in the file of this patent

UNITED STATES PATENTS

| | | |
|---|---|---|
| 839,772 | Krause | Dec. 25, 1906 |
| 949,357 | Hebbeler | Feb. 15, 1910 |
| 1,116,234 | Brown | Nov. 3, 1914 |
| 1,362,998 | Lindemann | Dec. 21, 1920 |
| 1,982,924 | Norquist | Dec. 4, 1934 |
| 2,023,910 | Bacheldor | Dec. 10, 1935 |
| 2,063,086 | Fitz Gerald | Dec. 9, 1936 |
| 2,198,175 | Palkin | Apr. 23, 1940 |
| 2,521,094 | Rein | Sept. 5, 1950 |
| 2,552,305 | Benedict | May 8, 1951 |
| 2,669,358 | Young | Feb. 16, 1954 |
| 2,779,478 | Wahlin | Jan. 29, 1957 |
| 2,821,305 | Anderson | Jan. 28, 1958 |
| 2,874,848 | Cannon et al. | Feb. 24, 1959 |